United States Patent
Tanioka

(10) Patent No.: US 9,465,224 B2
(45) Date of Patent: Oct. 11, 2016

(54) IMAGE DISPLAY DEVICE AND IMAGE DISPLAY METHOD

(71) Applicant: CANON KABUSHIKI KAISHA, Tokyo (JP)

(72) Inventor: Hiroshi Tanioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 14/190,645

(22) Filed: Feb. 26, 2014

(65) Prior Publication Data

US 2014/0254008 A1  Sep. 11, 2014

(30) Foreign Application Priority Data

Mar. 11, 2013  (JP) .................................. 2013-048490

(51) Int. Cl.
G02B 27/22 (2006.01)
H04N 13/00 (2006.01)
H04N 13/04 (2006.01)

(52) U.S. Cl.
CPC ...... *G02B 27/2214* (2013.01); *H04N 13/0007* (2013.01); *H04N 13/0402* (2013.01); *H04N 13/0447* (2013.01); *H04N 13/0497* (2013.01)

(58) Field of Classification Search
CPC ..................... H04N 13/0007; H04N 13/0402; H04N 13/0479; G02B 27/22; G02B 27/225
See application file for complete search history.

(56) References Cited

U.S. PATENT DOCUMENTS

| 2010/0225743 | A1* | 9/2010 | Florencio | H04N 13/0014 348/46 |
|---|---|---|---|---|
| 2012/0033046 | A1 | 2/2012 | Ozaki | |
| 2012/0182577 | A1 | 7/2012 | Tashiro et al. | |
| 2013/0176203 | A1* | 7/2013 | Yun | G02B 27/2214 345/156 |
| 2013/0235169 | A1* | 9/2013 | Kato | G02B 27/01 348/53 |

FOREIGN PATENT DOCUMENTS

| CN | 102023708 A | 4/2011 |
| CN | 102378023 A | 3/2012 |
| CN | 202750185 U | 2/2013 |
| JP | 09-159970 A | 6/1997 |
| JP | 3426821 B2 | 7/2003 |

OTHER PUBLICATIONS

Nov. 26, 2015 Chinese Official Action in Chinese Patent Appln. No. 201410086755.8.

* cited by examiner

*Primary Examiner* — Huy T Nguyen

(74) *Attorney, Agent, or Firm* — Fitzpatrick, Cella, Harper & Scinto

(57) ABSTRACT

If a detected orientation of a device is turned 180 degrees from the upright direction, a three-dimensional image that can be viewed normally as a stereoscopic view can be displayed regardless of the orientation in which the device is used, by turning images that are to be viewed respectively by the left and right eyes, and inverting the arrangement of the images that are to be viewed respectively by the left and right eyes.

17 Claims, 14 Drawing Sheets

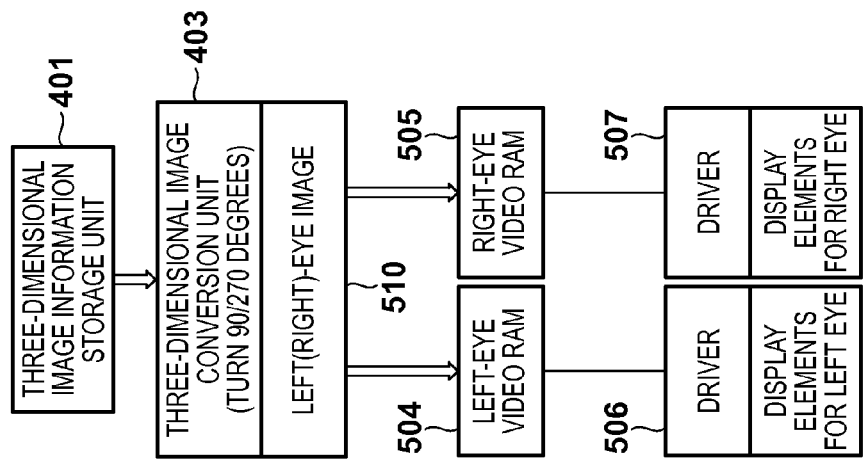
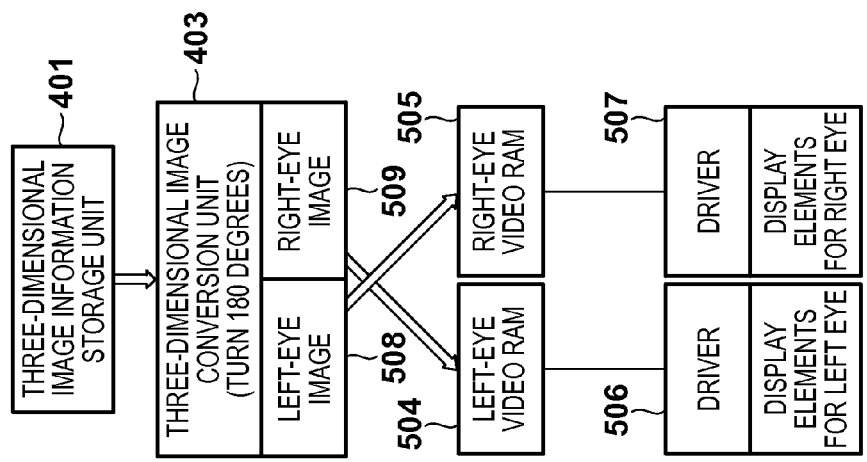
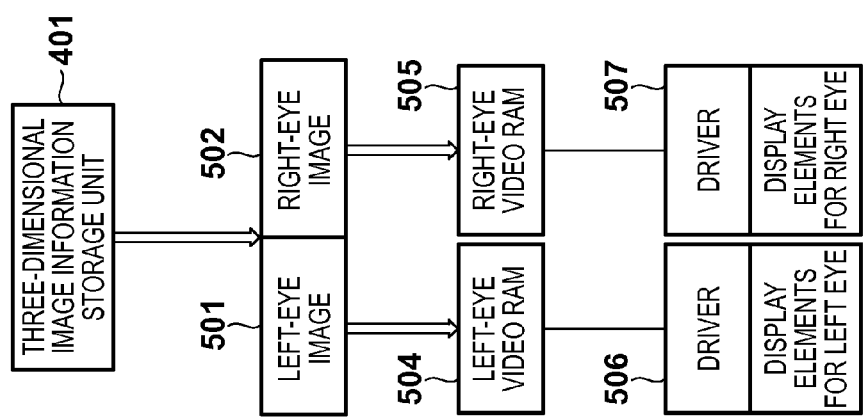

FIG. 8
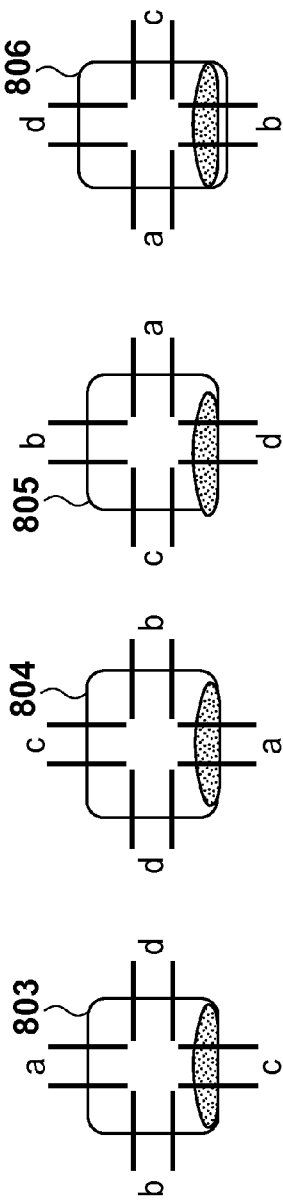
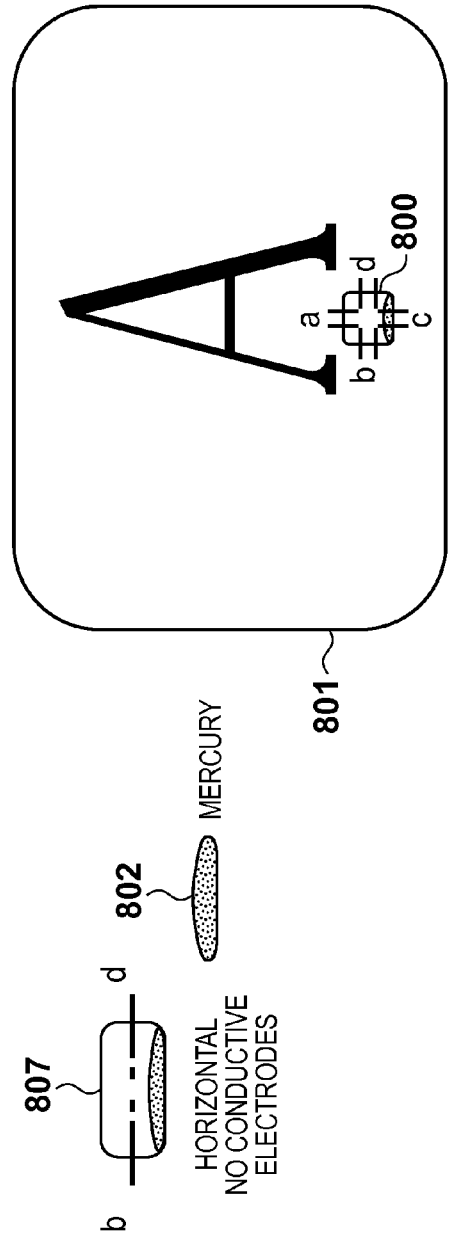

CASE WHERE DEVICE IS IN LATERAL ORIENTATION

F I G. 11
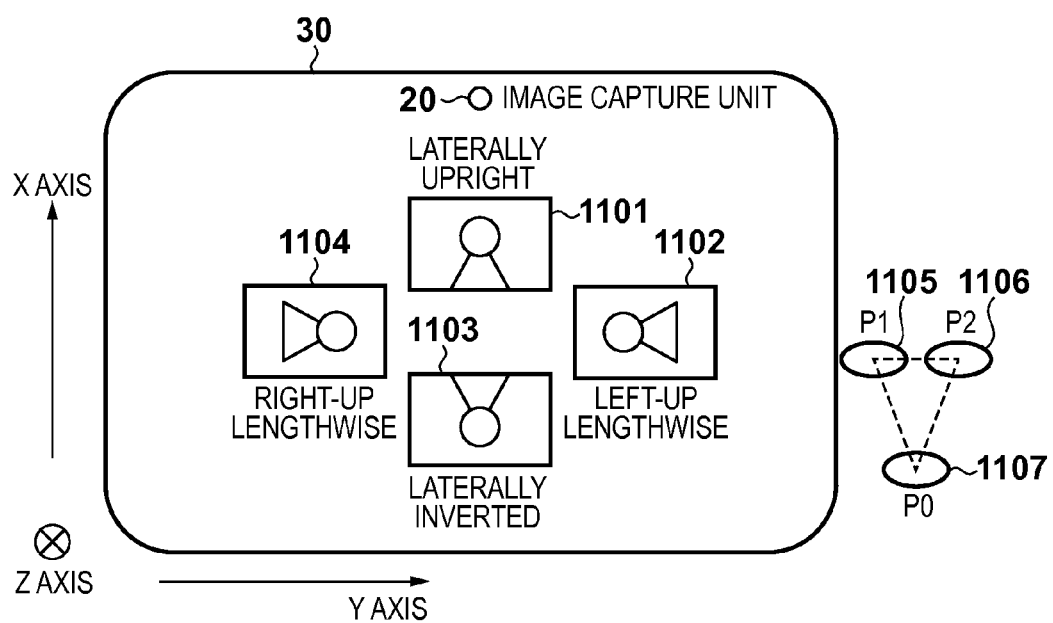

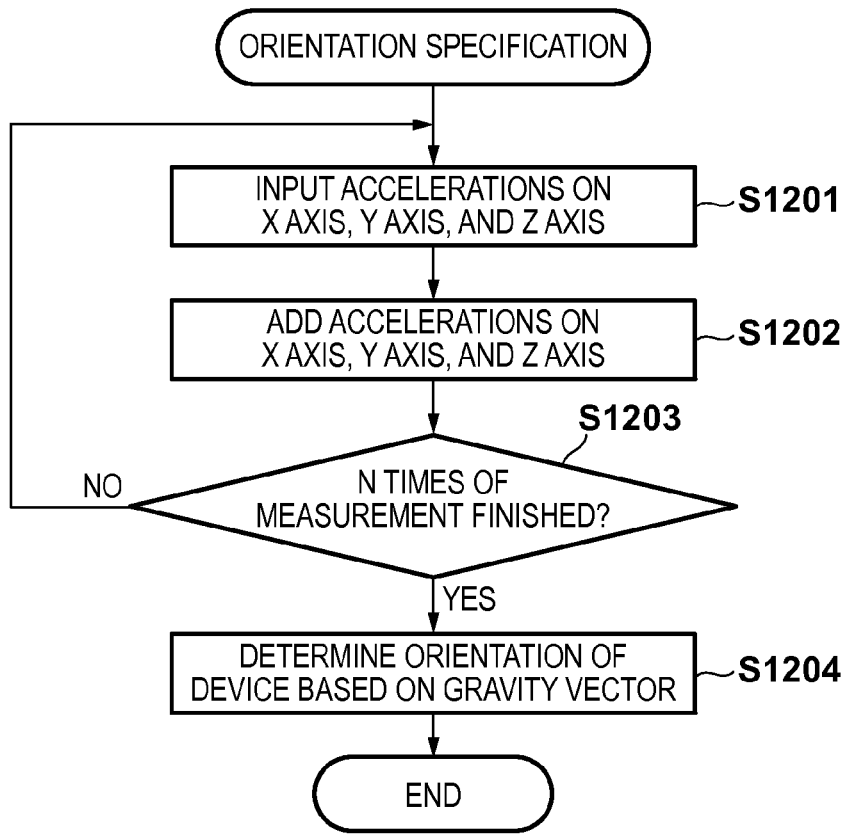

F I G. 13A
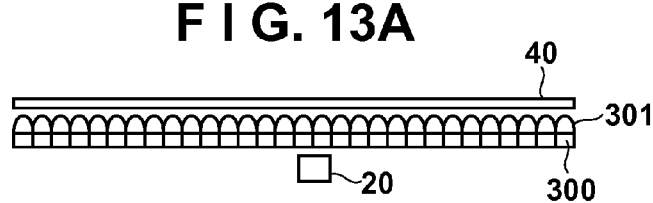
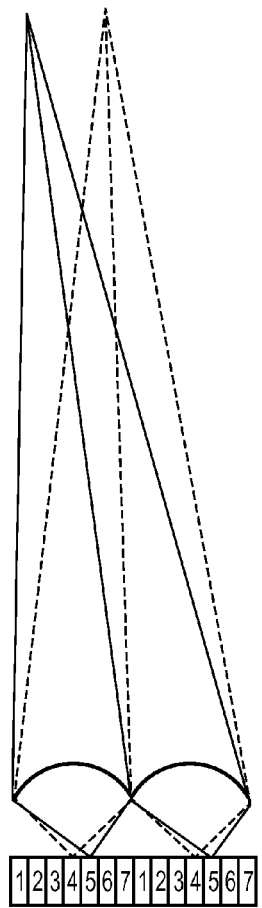
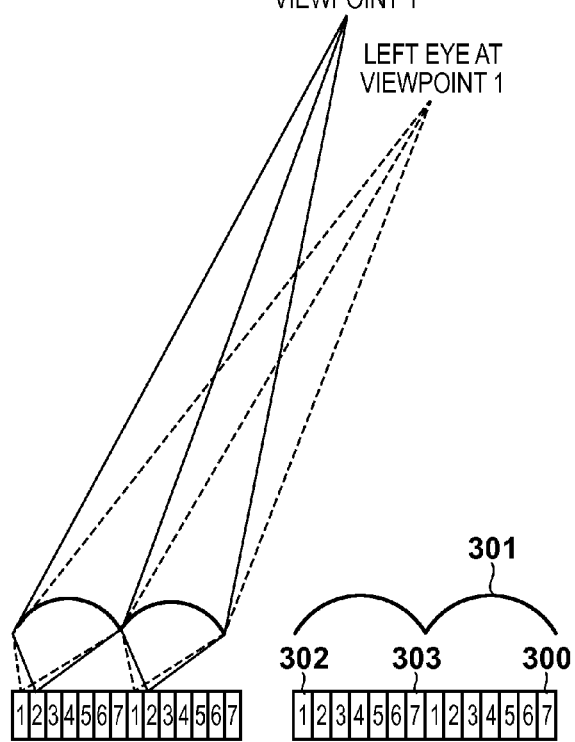
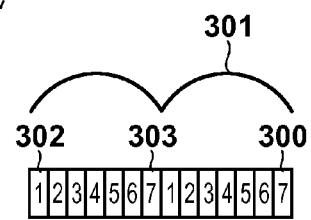
F I G. 13D     F I G. 13C     F I G. 13B FIG. 14
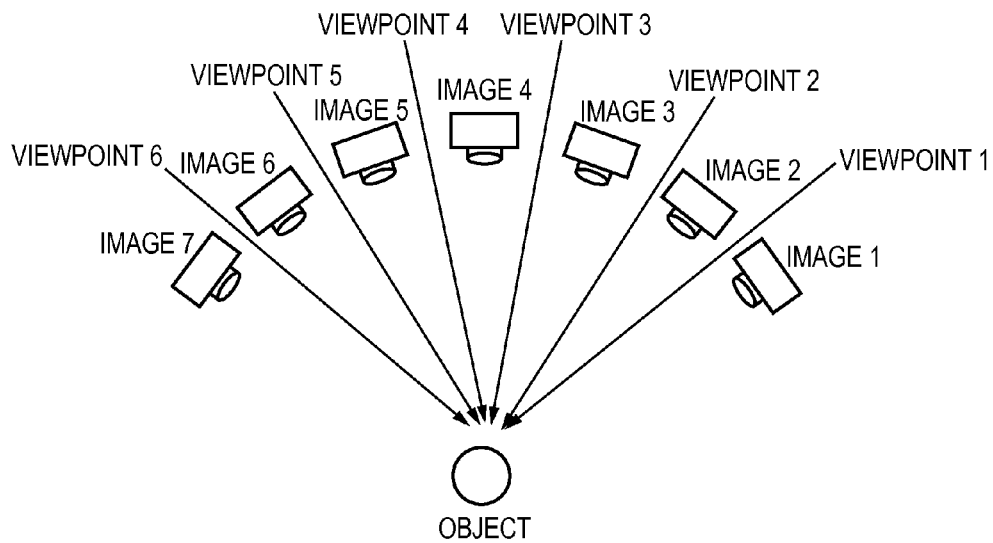
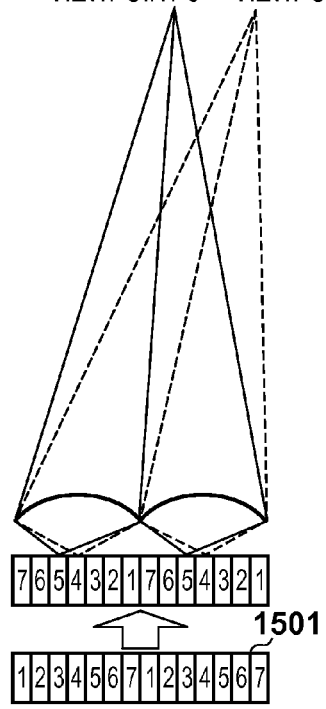
FIG. 15A
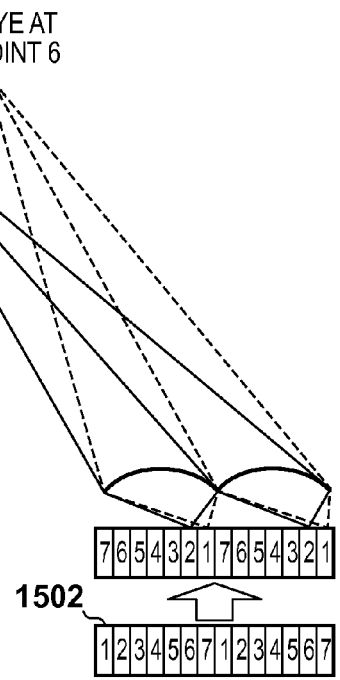
FIG. 15B

IMAGE DISPLAY DEVICE AND IMAGE DISPLAY METHOD

BACKGROUND OF THE INVENTION

1. Field of the Invention

The present invention relates to an image display device and an image display method for displaying three-dimensional image information in accordance with the orientation of a three-dimensional display, for example.

2. Description of the Related Art

With a tablet PC having a two-dimensional display, if the display screen of the two-dimensional display faces a user and is then turned 90 degrees, an image displayed on the screen is also turned 90 degrees in the opposite direction, and the user can view the image in the same orientation before and after the turning. That is to say, the tablet PC having the two-dimensional display displays an image on its display screen, with consideration given to the orientation of the display screen of the two-dimensional display (e.g., whether the display screen is in a portrait orientation or a landscape orientation). As for a tablet PC having a three-dimensional display as well, it is desired that three-dimensional display is performed, with consideration given to the orientation of a display screen of the three-dimensional display, as with the aforementioned tablet PC having the two-dimensional display.

Japanese Patent No. 3426821 discloses a technique for performing three-dimensional display with a mobile terminal that is capable of parallax barrier three-dimensional display, while the direction in which the barrier stripes of the parallax barrier are generated, that is, the position of the parallax barrier is switched dynamically, in accordance with whether the three-dimensional display is in the portrait or the landscape orientation.

With Japanese Patent No. 3426821, a three-dimensional image can be displayed by electrically switching the position of the parallax barrier with respect to the case where the display screen is in the portrait orientation and the case where the display screen is in the landscape orientation, such that paired parallax images that are displayed by display elements are viewed separately by predetermined eyes, that is, so as to have a right image be viewed by the right eye and a left image be viewed by the left eye. However, with a three-dimensional display that is not configured to change the position of the parallax barrier, if the user turns the screen of a tablet PC from an upright state, he/she cannot view an upright three-dimensional image.

SUMMARY OF THE INVENTION

The present invention was made in view of the above-described conventional example, and provides an image display device and an image display method for displaying a three-dimensional image that can be viewed stereoscopically as originally intended, in accordance with the turning of a screen.

According to an aspect of the present invention, there is provided an image display device comprising: a stereoscopic screen which displays a left-eye image and an right-eye image that reflect a parallax between left and right eyes of a user; detection unit which detect an orientation of the stereoscopic screen; and display control unit which display, on the stereoscopic screen, the left-eye image and the right-eye image in a predetermined direction and in a predetermined arrangement for the left eye and the right eye, respectively, based on the orientation detected by the detection unit.

According to another aspect of the present invention, there is provided an image display method for displaying a left-eye image and a right-eye image that reflect a parallax between left and right eyes of a user on a stereoscopic screen, comprising: detecting an orientation of the stereoscopic screen; and causing the left-eye image and the right-eye image to be displayed on the stereoscopic screen in a predetermined direction and in a predetermined arrangement for the left eye and the right eye, respectively, based on the detected orientation.

According to the present invention, even in a state where the device has been turned 180 degrees, three-dimensional display is possible that can be viewed stereoscopically as in a state where the device is in an upright state.

Further features of the present invention will become apparent from the following description of exemplary embodiments with reference to the attached drawings.

BRIEF DESCRIPTION OF THE DRAWINGS

FIGS. 5A, 5B, and 5C are diagrams illustrating embodiments of a three-dimensional image display control unit in accordance with an orientation according to an embodiment.

FIG. 8 is a diagram illustrating a device orientation detection sensor according to an embodiment.

FIG. 11 is a diagram illustrating a modification 1 of an orientation specifying unit.

FIGS. 12A and 12B are diagrams illustrating a modification 2 of the orientation specifying unit.

FIGS. 13A, 13B, 13C, and 13D are diagrams illustrating another embodiment using a lenticular lens three-dimensional display.

FIG. 14 is a diagram showing a relationship between multiple viewpoints and multi-view images.

FIGS. 15A and 15B are diagrams illustrating the way an image is viewed when a multi-view display is turned 180 degrees.

DESCRIPTION OF THE EMBODIMENTS

First Embodiment

Definition

Figure 1:
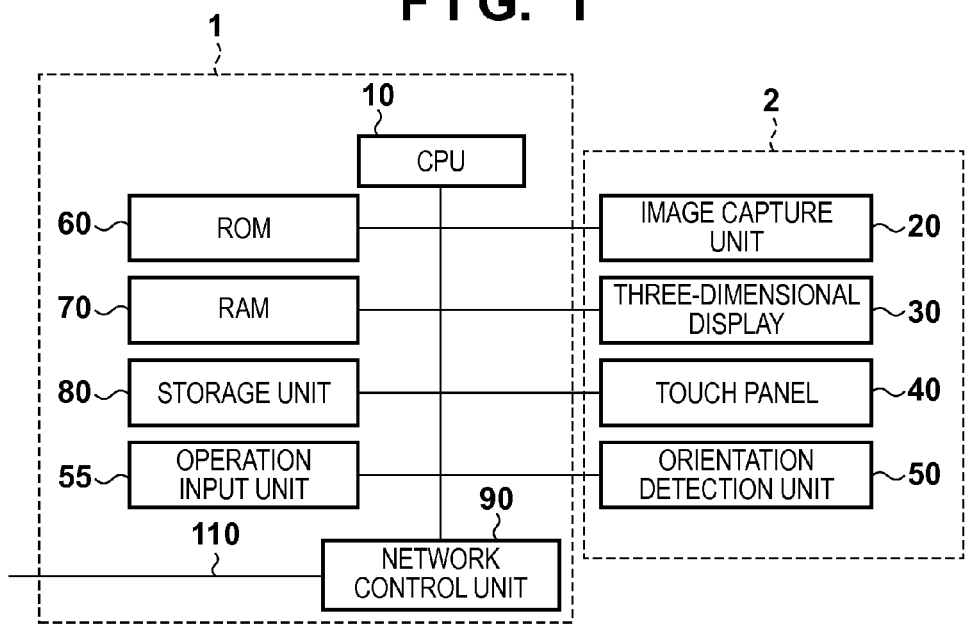
FIG. 1 is a schematic view showing an exemplary image processing apparatus according to an embodiment.

Prior to the description of the embodiments, terms used in the present specification will be briefly described. A "two-dimensional image" means a two-dimensional image that is displayed by a display and shows a person or a diagram, for example. A "three-dimensional image" means an image that is displayed by a three-dimensional display so as to enable stereoscopic viewing, and shows a person or a diagram, for example. In the present embodiment, a three-dimensional image is constituted by a plurality of two-dimensional images having a parallax that is generated when the same three-dimensional object is viewed at different angles. For example, paired two-dimensional images with a parallax for the left eye and the right eye are displayed with predetermined display elements, that is, display elements respectively for the right eye and left eye, and a three-dimensional image is an image that can be stereoscopically viewed by a user, who is an observer of these images, viewing the images with his/her left and right eyes, respectively.

"Two-dimensional image information" and "three-dimensional image information" means image information for displaying the two-dimensional image and the three-dimensional image, respectively. The three-dimensional image information is constituted by at least a pair of pieces of two-dimensional image information for the left eye and the right eye. Assuming that pieces of two-dimensional image information for the left eye and the right eye, respectively, that originate from one viewpoint are a pair of pieces of stereoscopic image information, some three-dimensional image information includes pairs of pieces of stereoscopic image information originating from multiple different viewpoints, the number of pairs corresponding to the number of viewpoints. For example, the former three-dimensional image information is used in the parallax barrier method, and the latter three-dimensional image information is used in the multi-view lenticular lens method. A "parallax image" means a pair of two-dimensional images that reflect the aforementioned parallax between the left eye and the right eye.

Configuration of Three-Dimensional Display

Next, the three-dimensional display will be briefly described. The three-dimensional display used in the embodiments of the present invention simultaneously displays multiple pieces of two-dimensional image information as three-dimensional image information in a screen of its display. Specifically, the two-dimensional image displayed on the three-dimensional display is an image based on multiple pieces of two-dimensional image information for at least two images of a single object viewed from the respective viewpoints of the left eye and the right eye of the user, and the three-dimensional display is provided with an optical mechanism for having the eyes view the respective images from the viewpoints of the left eye and the right eye.

Hereinafter, a mode for carrying out the present invention will be described using the drawings. The present embodiment will be described, taking, as an example, an image processing apparatus for performing three-dimensional display in a normal manner even when a user uses the display while the display is turned 180 degrees. However, the present invention is not limited thereto. Note that assuming that the direction of the display at a certain time when the user views the display screen of the display and the display screen of the display faces the user is an upright direction, "using the display while the display is turned 180 degrees" means that the display screen is viewed in a direction opposite to the upright direction, that is, in an inverted direction. That is to say, it means that the relative direction of the display when the user views the display screen is changed from the upright direction to the inverted direction. This applies to the following description.

FIG. 1 is a schematic view showing an exemplary image processing apparatus for carrying out the present invention. In FIG. 1, the image processing apparatus in the present embodiment has a general personal computer (hereinafter referred to as a "PC") 1, and acquires image information or the like from a network line 110 or the like via a network control unit 90. The image processing apparatus also has at least a three-dimensional display device 2 for stereoscopically displaying a three-dimensional image based on the three-dimensional image information.

The PC 1 is controlled by a CPU (Central Processing Unit) 10. The PC 1 has a storage unit 80 that holds the three-dimensional image information and programs or the like used in the present embodiment. The PC 1 also has a ROM (Read Only Memory) 60 that stores various settings and programs and a RAM (Random Access Memory) 70 that functions as a temporary storage means. The PC 1 also has a network control unit 90 connected to a network line 110 such as a LAN. The three-dimensional display device 2 has a three-dimensional display 30 that displays a three-dimensional image. The three-dimensional display device 2 also has a touch panel 40 on a display surface of the three-dimensional display, and enables an image or a displayed input key to be selected by a displayed three-dimensional image being directly touched, and enables various input operations to the PC by the user, similarly to an operation input unit 55 constituted by keys and a mouse. An image capture unit 20 is a camera, for example, and is provided in the vicinity of the three-dimensional display 30 in order to recognize the position of the user and the movement of the user. The image capture unit 20 may be omitted in the present embodiment. The three-dimensional display device 2 is further provided with an orientation detection unit 50 that detects an orientation (which can also be said as inclination in the up-down direction) of the three-dimensional display 30. Here, the detected orientation is represented by at least an orientation of a screen of the three-dimensional display 30 varying with a turn of the three-dimensional display 30 around an axis perpendicular to the vertical direction. Regarding the orientation of the screen to be detected, in practice, the lower side of the screen is detected using a gravity sensor, or if the three-dimensional display 30 is pivotably supported to a base, the direction relative to the base is detected using a microswitch or the like. The details will be described later.

Figure 2:
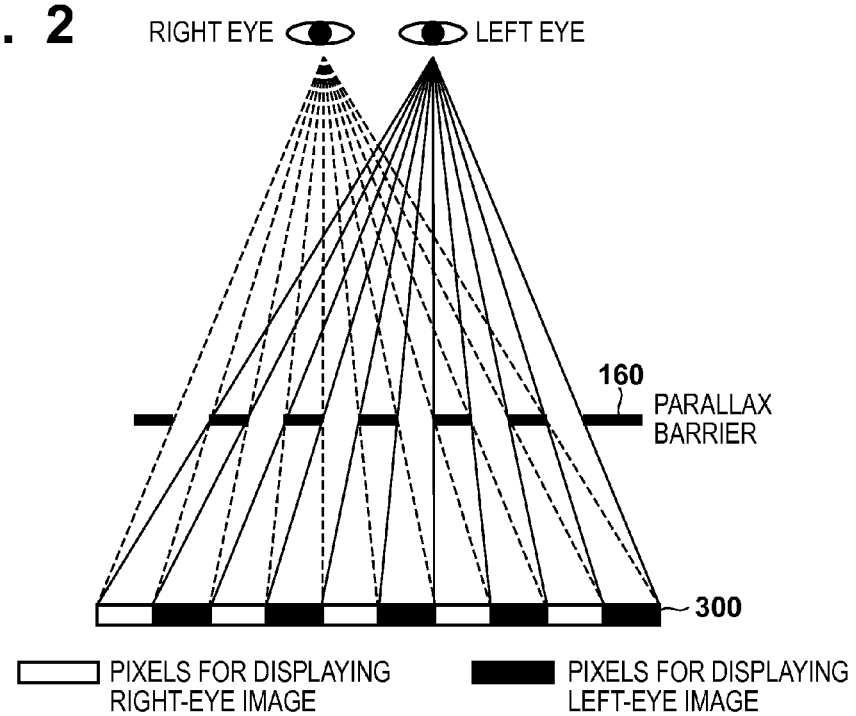
FIG. 2 is a diagram illustrating a three-dimensional display device 2 according to an embodiment in more detail.

FIG. 2 is a diagram illustrating the three-dimensional display device 2 shown in FIG. 1 in more detail. A liquid crystal display 300 of the parallax barrier three-dimensional display 30 shown in FIG. 2 has, in front of the display screen, an optical parallax barrier 160 for, on the lines of sight of the left and right eyes, blocking light from the display elements for the right and left eyes, respectively.

Accordingly, as shown in FIG. 2, optical paths from the display pixels for the left eye are blocked by the parallax barrier 160 as viewed from the right eye, and optical paths from the display pixels for the right eye are blocked by the parallax barrier 160 as viewed from the left eye. As a result, each eye can independently view a different image for a viewpoint that is separately photographed from the viewpoint of the corresponding eye, for example. That is to say, a stereoscopic image is displayed.

Figure 3:
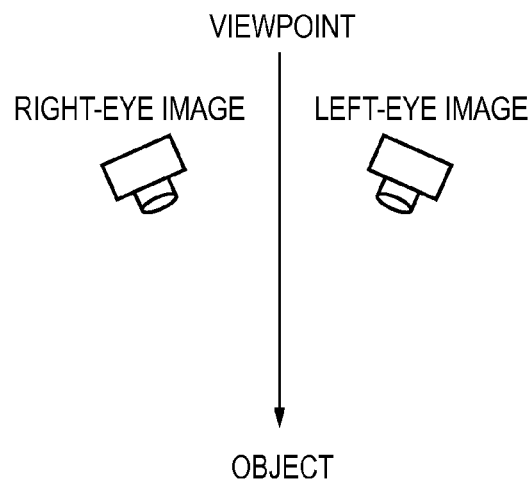
FIG. 3 is a diagram showing a relationship between a viewpoint and paired parallax images according to an embodiment.

For the sake of simplification of the description, the three-dimensional display 30 in the present embodiment performs monochromatic display, and an array of the display pixels is expressed one-dimensionally in the following diagrams. Note that when simply stating a "viewpoint" in the following description, it means the position of the eyes of the user with respect to the position of the three-dimensional display 30, and, with a single "viewpoint", the right eye of the user can view an image for the right eye ("right-eye image"), and the left eye can view an image for the left eye ("left-eye image"). To display a three-dimensional image, at least one pair of the right-eye image and the left-eye image with a predetermined parallax need only be displayed. FIG. 3 is a diagram showing a positional relationship between the aforementioned viewpoint, and the right-eye image and the left-eye image that are photographed as viewed by the user's eyes.

Functional Blocks of Image Processing Apparatus

Figure 4:
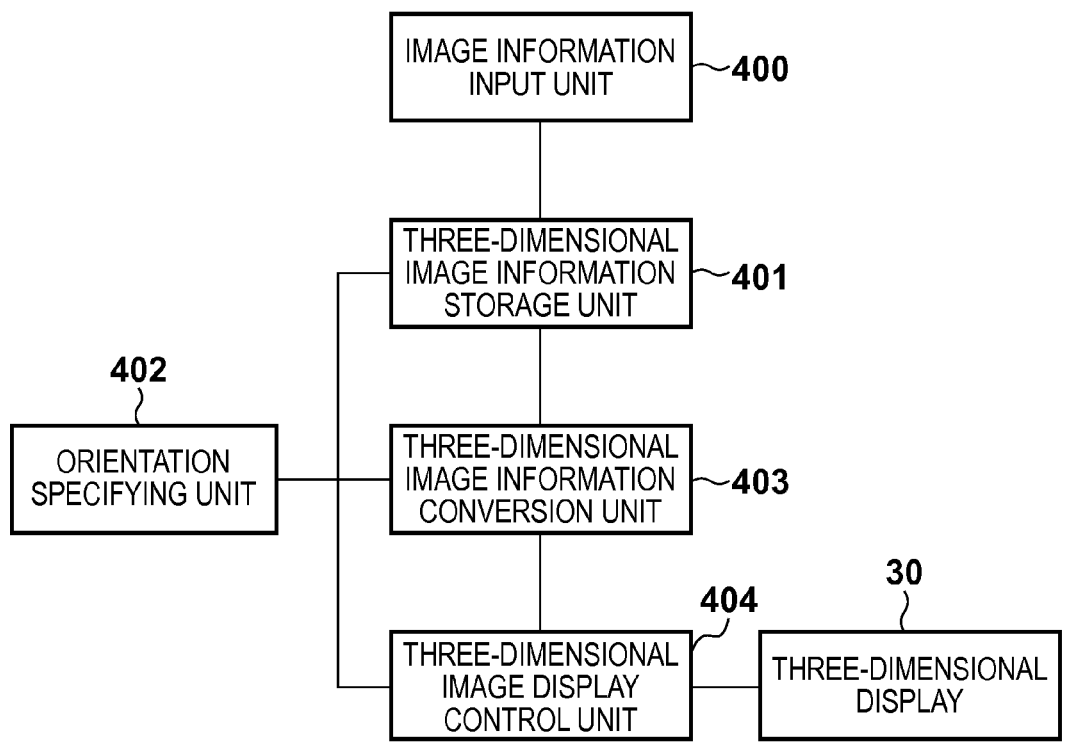
FIG. 4 is a diagram showing exemplary functional blocks of the image processing apparatus according to an embodiment.

FIG. 4 is a diagram showing exemplary blocks of image processing functions of the image processing apparatus in the present embodiment. In FIG. 4, an image information input unit 400 inputs three-dimensional image information from the network control unit 90 or the like, and stores the three-dimensional image information in a three-dimensional image information storage unit 401 when necessary. An orientation specifying unit 402 is a processing unit for specifying the orientation of the display device 2 based on sensor output, which will be described later, of the orientation detection unit 50 mounted in the display device 2. A three-dimensional image information conversion unit 403 retrieves the three-dimensional image information stored in the three-dimensional image information storage unit 401 in accordance with the specified orientation, and performs processing for turning or the like by the necessary angle. The three-dimensional image display control unit 404 performs control for displaying the image information obtained by performing conversion in the three-dimensional image information conversion unit 403 in accordance with the specified orientation, with predetermined display elements of the three-dimensional display 30. Specifically, the image information obtained by performing conversion with the three-dimensional image information conversion unit 403 is written in a so-called VRAM that holds right-eye display image information or a VRAM that holds the left-eye display image information. Note that drivers connected to display elements that display the images for the left and right eyes in the three-dimensional display 30 that are in one-to-one correspondence with storage elements of the VRAMs are driven physically, based on the image information stored for the left and right eyes in the VRAMs at a fixed cycle, and display is thus performed. Note that the three-dimensional image information storage unit 401 is a part of the storage unit 80, or the RAM 70 that temporarily holds images.

Figure 6:
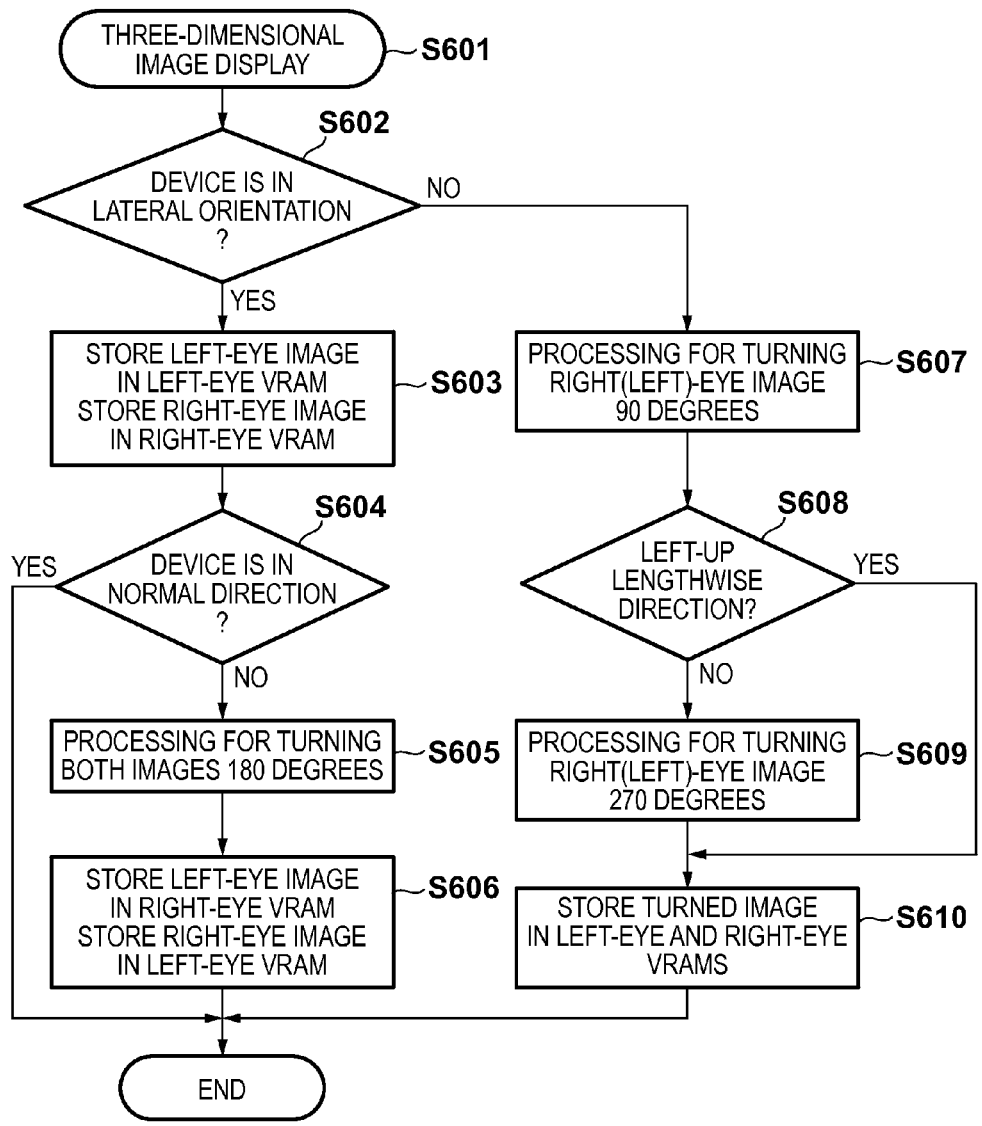
FIG. 6 is a flowchart of three-dimensional display control in accordance with the orientation according to an embodiment.

FIGS. 5A and 5B show an embodiment of the control for reliably performing three-dimensional display in whatever orientation the device is operated, according to the present embodiment. FIG. 6 is a flowchart illustrating a procedure of the control. First, a detailed description will be given of the case where the device in a normal lateral orientation (hereinafter referred to as "laterally upright orientation"). Note that in this example, the direction of the display device that is to be parallel with the line of the left and right eyes in order for the user to observe the screen of the three-dimensional display device and obtain a stereoscopic view is referred to as "lateral", and the direction perpendicular thereto is referred to as "lengthwise". The orientation of the device when the lateral direction of the device is aligned with the left-right direction of the user is the lateral orientation. The orientation of the device when the lengthwise direction of the device is aligned with the left-right direction of the user is the lengthwise orientation. That is to say, if the device is in the lateral orientation, a stereoscopic view is possible. The lengthwise and lateral directions of the device are determined depending on the three-dimensional display method. For example, in the case of the parallax barrier method, the direction perpendicular to the longitudinal direction of the barrier is the lateral direction, and in the case of the lenticular lens method, the direction perpendicular to the longitudinal direction of the lenticular lens is the lateral direction. Although the lateral direction of many devices is the longitudinal direction of the screen, this is not always the case, and the above-defined lengthwise and lateral directions of the device are not directly associated with the aspect ratio of the screen. There are two types of the lateral orientations of the device that are different 180 degrees, one of which will be called an upright (laterally upright) direction, and the other will be called an inverted (laterally inverted) direction.

The three-dimensional display procedure in the present embodiment will be described below in accordance with FIG. 6. Initially, in step S602, the orientation specifying unit 402 determines whether the orientation of the device is lengthwise or lateral, and if lateral, three-dimensional display is possible since the three-dimensional display 30 employs the parallax barrier method, and the processing branches into step S603. In step S603, the three-dimensional image display control unit 404 reads out left-eye image information 501 to be displayed from the three-dimensional image information storage unit 401, writes the read left-eye image information 501 in a left-eye video RAM (hereinafter referred to as "VRAM") 504, similarly reads out right-eye image information 502 from the three-dimensional image information storage unit 401 and writes the right-eye image information 502 in a right-eye VRAM 505.

Here, the display elements of the liquid crystal display 300 that constitutes the three-dimensional display 30 alternately display the left-eye image and the right-eye image in stripes in accordance with the position of the parallax barrier 160, and the left (right)-eye VRAM is a RAM that stores the image information for driving all display elements that display the left (right)-eye image whose positions are fixed in the liquid crystal display 300 as described above. Accordingly, in the case of a three-dimensional display capable of color display, the left-eye (right-eye) VRAM is further divided into VRAMs for every color so as to correspond to the positions of color filters provided in front of the liquid crystal display elements.

In step S604, if the orientation specifying unit 402 further determines that the direction of the device is the laterally upright, the processing ends. As shown in FIG. 5A, the image information written in the left-eye VRAM 504 is connected to a driver 506 that drive the display elements for the left-eye image in one-to-one correspondence, and similarly, the image information written in the right-eye VRAM 505 is connected to a driver 507 that drives the display elements for the right-eye image in one-to-one correspondence. For this reason, the right-eye image is displayed as-is by the display elements for the right eye, and the left-eye image is displayed as-is by the display elements for the left eye.

Next, a detailed description will be given to the case where the device is in the laterally inverted orientation. In step S604, if the orientation specifying unit 402 determines that the device is in the laterally inverted orientation, in which the device is turned 180 degrees from the normal laterally upright orientation, the processing branches into step S605. In step S605, the three-dimensional image information conversion unit 403 turns the image information for the left eye and the right eye 180 degrees so as to display the normal image in a state where the three-dimensional display 30 is in the inverted orientation.

Figure 7:
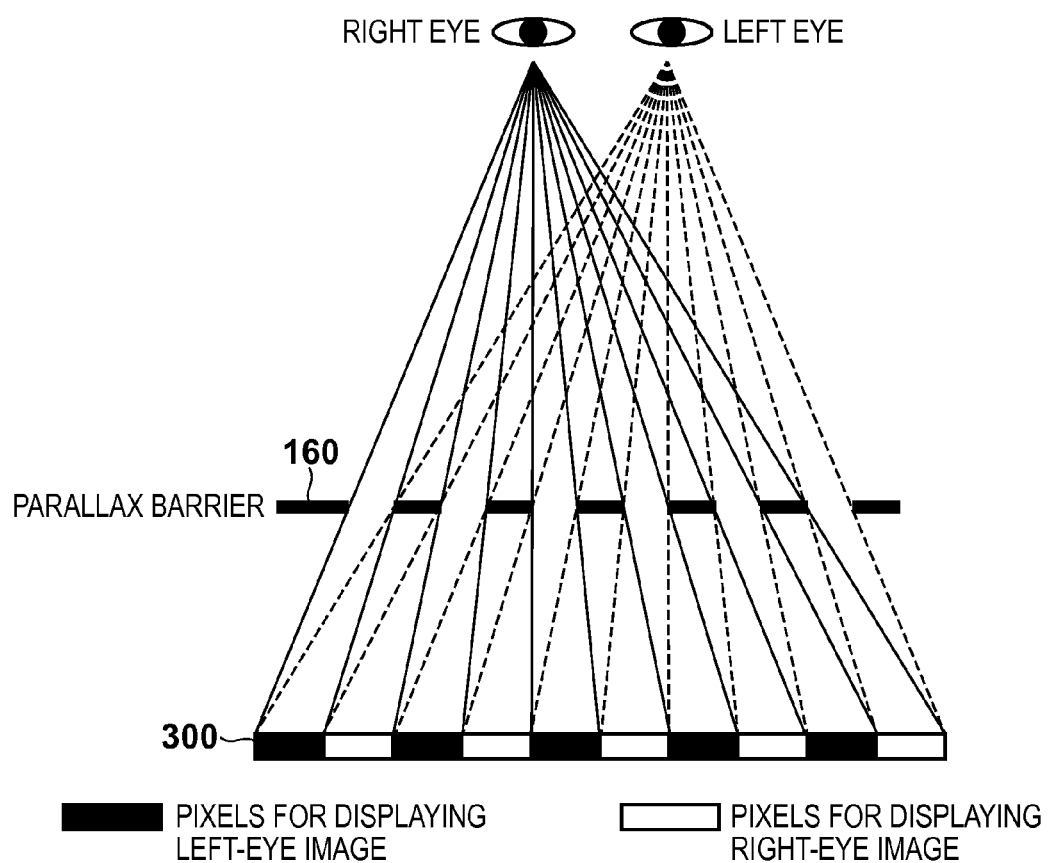
FIG. 7 is a diagram illustrating the way a display image is viewed when a display is turned 180 degrees.

Incidentally, FIG. 7 shows the way the image is viewed when the parallax barrier three-dimensional display 30 shown in FIG. 2 has been turned 180 degrees, and the turned right-eye image and the turned left-eye image are displayed respectively with the display elements for the right eye and the display element for the left eye. As described above, the parallax barrier three-dimensional display 30 performs display by dividing the left-eye and right-eye images, and accordingly, the positions of the liquid crystal display 300 and the barrier 160 for blocking the optical paths thereof are mechanically fixed. Accordingly, when the device is in the laterally inverted orientation, the user views the display with the left and right being inverted with respect to the laterally upright orientation, and therefore, if the images for the respective eyes are turned 180 degrees, the display pixels that display the left-eye image are viewed by the right eye, and the display pixels that display the right-eye image are viewed by the left eye.

When a parallax image is viewed with its left and right being inverted at the time of three-dimensional display, the depth direction is inverted such that the side away from the user appears to be the side close to the user, and the side close to the user appears to be the side away from the user. However, since the rendering order does not change, an image object that appears on the side close to the user is hidden by the shade of an image object on the side away from the user, and the display image thus has a very strange appearance.

That is to say, three-dimensional display cannot be performed correctly only by turning the image information 180 degrees in the three-dimensional image conversion unit 403. For this reason, in the case where the device is in the laterally inverted direction, in step S606, the three-dimensional image display control unit 404 in the present invention writes the left-eye image information 508 that has been turned 180 degrees in the three-dimensional image information conversion unit 403 in the right-eye VRAM 505, and similarly writes the right-eye image information 509 that has been turned 180 degrees in the three-dimensional image information conversion unit 403 in the left-eye VRAM 504. That is to say, not only is the direction of the images aligned with the direction of the display device, but the order of the arrangement of the images is also changed in accordance with the direction of the display device.

FIG. 5B shows the details thereof. The image information for the left and right eyes is turned 180 degrees, and thereafter, the turned left-eye image 508 and the turned right-eye image 509 are written respectively to the right-eye VRAM 505 and the left-eye VRAM 504, and are displayed with the corresponding display elements by the corresponding drivers 507 and 506. As a result, in FIG. 7, the left-eye image that has been turned 180 degrees is displayed with the display pixels for the right-eye image, which are viewed by the left eye, and the right-eye image that has been turned 180 degrees is displayed with the display pixels for the left-eye image, which are viewed by the right eye, and thus, the originally-intended stereoscopic view of the three-dimensional image is possible.

Next, a detailed description will be given to a case where the device is in the lengthwise orientation, that is, a case where the direction to be aligned with the left-right direction of the user in order to obtain a stereoscopic view is aligned with the up-down direction of the user. If the orientation specifying unit 402 determines in step S602 that the device is in the lengthwise orientation, the processing branches into step S607. Since the three-dimensional display 30 in the present embodiment cannot perform three-dimensional display when in the lengthwise orientation, the three-dimensional display 30 performs two-dimensional display when the device is used in the lengthwise orientation in the present embodiment. Accordingly, in step S607, the three-dimensional image information conversion unit 403 reads out the left (right)-eye image information from the three-dimensional image information storage unit 401 and turns the image information 90 degrees. Note that if the orientation specifying unit 402 determines in step S608 that the device is in the lengthwise orientation in which its upper side is its left portion when in the lateral orientation (hereinafter referred to as "left-up lengthwise orientation"), the processing branches into step S610, the left-eye image information 510 that has been turned 90 degrees in the three-dimensional image information conversion unit 403 is written in the right-eye VRAM 505, and the same left-eye image information 510 is written in the left-eye VRAM 504. If the orientation specifying unit 402 determines in step S608 that the device is in the lengthwise orientation in which its upper side is its right portion when in the lateral orientation (hereinafter referred to as "right-up lengthwise orientation"), the processing branches into step S609, and the left (right)-eye image information 510 that has been turned 270 degrees in the three-dimensional image information conversion unit 403 is written in the right-eye video RAM (hereinafter referred to as "VRAM") 505 and the left-eye VRAM 504.

FIG. 5C shows the details thereof. The image information for either the left or right eye is turned 90 degrees or 270 degrees, and is written in the right-eye VRAM 505 and the left-eye VRAM 504. That is to say, the same image information is written in these VRAMs. Then, the image information is displayed with the corresponding display elements by the corresponding driver 507 or 506. As a result, the same image, which is obtained by turning an original image for the left or right eye 90 (or 270) degrees is displayed with the display pixels for the right-eye image and the display pixels for the left-eye image. If the display device is used in the lengthwise orientation, the respective pixels for the left and right eyes are arranged in the lengthwise direction and disposed alternatingly, and accordingly, the image for a selected eye is two-dimensionally displayed, while the resolution in the left-right direction decreases.

As described above, the feature of the three-dimensional image display control unit 404 in the present embodiment lies in that it reads out the image information to be displayed from the three-dimensional image information storage unit 401, converts the image information in the three-dimensional image information conversion unit 403 in accordance with the orientation, and performs control for the writing of the converted image information to the left-eye VRAM 504 or the right-eye VRAM 505.

Note that if step S603 in FIG. 6 is moved so as to be executed immediately after it is determined in step S604 that the device is in the "normal direction", it is not necessary to needlessly execute step S603 anymore, which contributes to speeding up the processing.

FIG. 8 shows an exemplary orientation detection means used in the orientation detection unit 50 in the present embodiment. It is assumed that this detection unit is used so as to be upright or in an oblique state with the lower side of the display image being the lower side of the display unit, while the user is in a position facing the display image substantially from the direct front. In a tilt detection sensor 800, a liquid conductive material 802 such as mercury is enclosed in a sealed container. Accordingly, the mercury moves in the gravity direction in accordance with the orientation thereof and makes a pair of electrodes conductive, which enables the tilt of the device to be detected. In the case where there are four electrode pairs, namely pairs a, b, c, and d, and the three-dimensional display 30 performs three-dimensional display in the normal orientation as shown in a state 801, if the tilt detection sensor 800 is attached to the back side of the three-dimensional display 30 as shown in the diagram, the electrode pair c is conductive as shown in a state 803. When the three-dimensional display 30 is in the laterally inverted orientation, the electrode pair a is conductive as shown in a state 804. When the three-dimensional display 30 is in the left-up lengthwise orientation, the electrode pair d is conductive as shown in a state 805. When the three-dimensional display 30 is in the right-up lengthwise orientation, the electrode pair b is conductive as shown in a state 806. Note that when the device is horizontal, no electrode pair is conductive as shown in state 807. The orientation of the display when the device is horizontal remains the orientation of the previous sate or it is the laterally upright orientation. In steps S602, S604, and S608 in FIG. 6, it is determined which state the device is in, based on the state of conductivity of the electrode pairs. The sensor 800 may also be configured to use a spindle that remains in the vertical direction due to being supported about an axis at a position other than the center of gravity, in place of the mercury, and use a microswitch or the like that is turned on when the spindle that pivots with respect to the direction of the device comes into contact with the microswitch or the like, in place of the electrode pairs. In any case, this method detects the directional relationship between the user and the device (screen), based on an assumption that the up-down direction of the user coincides with the up-down direction of the vertical line.

Alternatively, if the three-dimensional display is pivotably supported about an axis to the base, the rotational phase around the axis may be detected by a microswitch or the like, and the result of this detection may be used as the detection result of the detection unit 50. This method detects the directional relationship between the user and the device, based on an assumption that the up-down direction of the user is fixed with respect to the base.

Alternatively, the orientation of the three-dimensional image display device may be specified by a manual operation of the user, and the input thereof may be used as the detection result. That is to say, if a specific gesture, e.g., a gesture of the user for specifying a side that the user faces is input from an operation panel of the three-dimensional display 30, the orientation of the three-dimensional image display device is specified in accordance with this gesture. In any case, the orientation detection unit 50 can be realized with various methods.

The above-described configuration realizes the image display that is appropriate for the orientation of the three-dimensional image display device. Accordingly, if the user views the screen from the direction in which a stereoscopic view is possible, a three-dimensional image can be displayed such that a stereoscopic view is possible. Further, if the user views the screen from the direction in which a stereoscopic view is not possible, a two-dimensional image can be displayed on the screen.

If a display object is a moving image, an application of the procedure in FIG. 6 to each frame of the moving image causes a large load, and the frame rate of the moving image may possibly not be able to be maintained, depending on the performance of the device. For this reason, the operation in FIG. 6 is executed prior to reproduction of the moving image, and in steps S603, S605, S606, S607, S609, and S610 in FIG. 6, the above-executed operation is not performed. In steps S603, S606, and S610, the VRAMs that store the right-eye image information and the left-eye image information are stored, and in steps S605, S607, and S609, a turning angle of the image information is stored. Note that the preset value of the turning angle is 0. Upon reproduction of the moving image being started, the image information of each frame is turned in accordance with the turning angle stored in the procedure in FIG. 6, and the image information is stored in the storage destination VRAM. Thus, a quick moving image reproduction is possible.

Modification of Three-Dimensional Display Control

Figure 9:
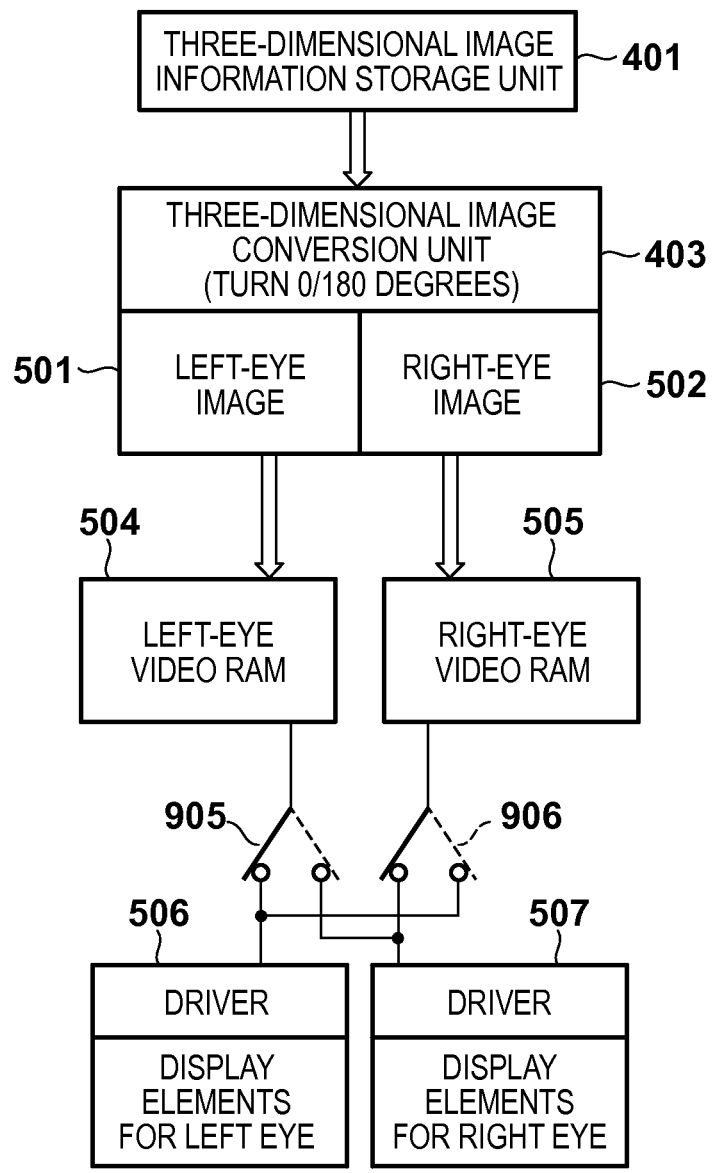
FIG. 9 is a diagram illustrating another embodiment of the three-dimensional image display control unit.
Figure 10:
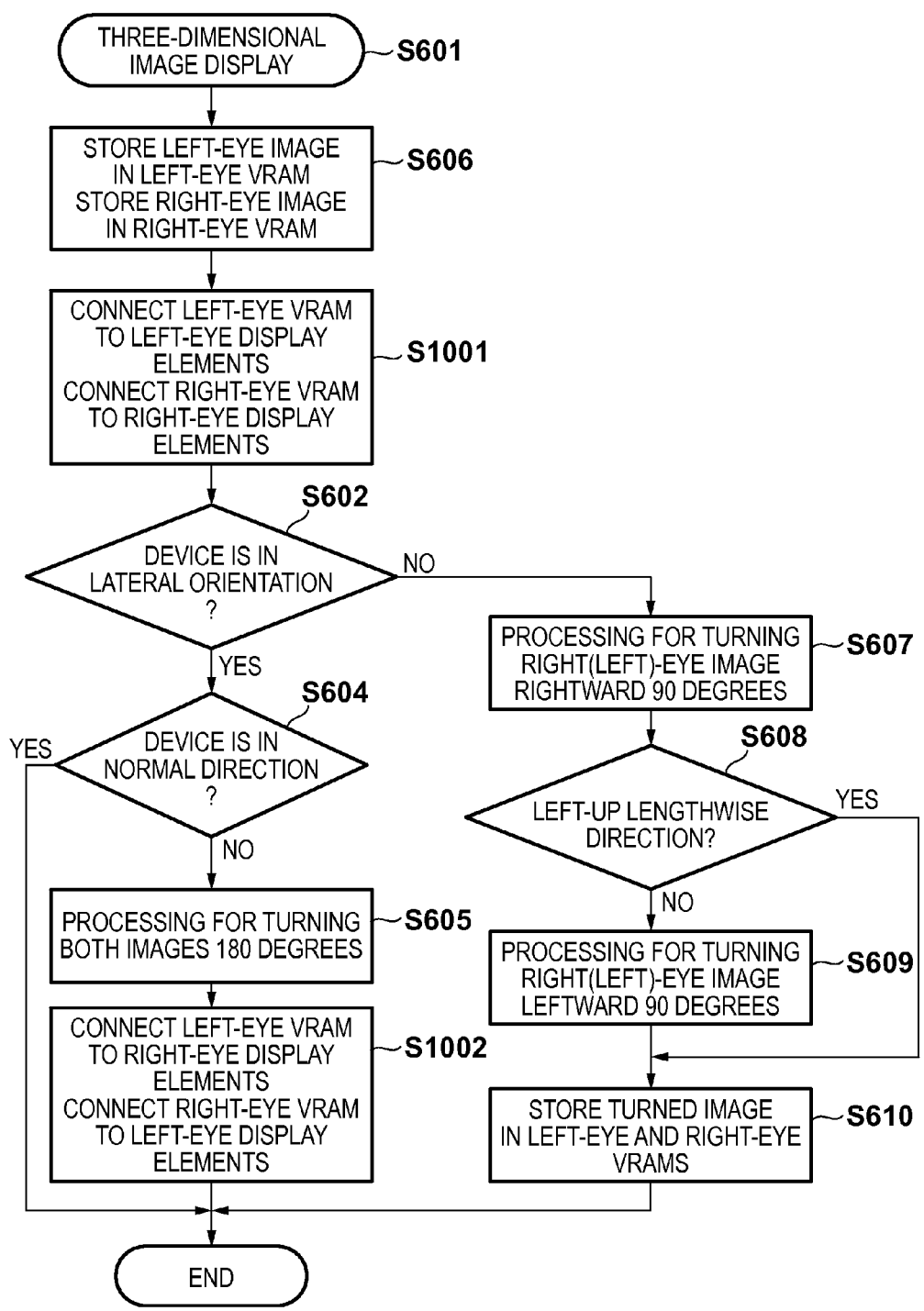
FIG. 10 is a flowchart of another embodiment of the three-dimensional image display control.

FIG. 9 shows another embodiment, which is a modification of the three-dimensional display control, and FIG. 10 shows a flowchart of the procedure of this control. The control in this embodiment in the case where the device is in the lengthwise orientation is the same as that in the prior embodiment, and accordingly will not be described. FIG. 9 shows only the case where the device is in the lateral direction.

In step S606, the three-dimensional image display control unit 404 reads out the left-eye image information 501 to be displayed from the three-dimensional image information storage unit 401, writes the read left-eye image information 501 in the left-eye video RAM (hereinafter referred to as VRAM) 504, similarly reads out the right-eye image information 502 from the three-dimensional image information storage unit 401, and writes the read right-eye image information 502 in the right-eye VRAM 505. In the prior embodiment, the left (right)-eye VRAM is associated with the driver that drives the display elements for the left (right)-eye image in a fixed manner in one-to-one correspondence, while the feature of the present embodiment lies in that there are two modes, namely a normal mode 905 in which the image information in the left (right)-eye VRAM is connected to the driver that drives the display elements for the left (right)-eye image, and an inverted mode 906 in which the image information in the left (right)-eye VRAM is connected to the driver that drives the display elements for the right (left)-eye image, and the mode is switched therebetween in accordance with the orientation of the device. First, in step S1001, the three-dimensional image display control unit 404 initializes both of the VRAMs and the display element drivers to the normal mode 905.

In step S602 and step S604, if the direction of the device is the laterally upright direction, the orientation specifying unit 402 ends the processing. On the other hand, if the orientation specifying unit 402 determines in step S604 that the device is in the laterally inverted direction, which is turned 180 degrees from the laterally upright direction, the processing branches into step S605. In order to three-dimensionally display a normal image in a state where the display is in an inverted state, in step S605, the three-dimensional image conversion unit 403 turns the image information 180 degrees.

Furthermore, in step S1002, the three-dimensional image display control unit 404 switches the mode of both of the VRAMs and the display element drivers to the inverted mode 906.

That is to say, regarding the three-dimensional image information, a pair of the left-eye image information and the right-eye image information is turned 180 degrees and subjected to the turning processing, and thereafter, the display elements for the left eye are driven based on the image information written in the right-eye VRAM, and the display elements for the right eye are driven based on the image information written in the left-eye VRAM. Accordingly, the image can be three-dimensionally displayed in a normal manner using the display 30 in the laterally inverted orientation.

An advantage of the present embodiment is that the same storage area prepared for the left and right eyes respectively can always be used, regardless of the orientation of the device, at the time of the three-dimensional image conversion processing, the reading out of the images for the left and right eyes from the three-dimensional image information storage unit, and the writing processing to both VRAMs.

Thus, in this modification, the image information for the left and right eyes are not stored in an inverse manner, i.e., stored respectively in the right-eye and left-eye VRAMs, but the associations between the VRAMs and the drivers (i.e., display elements) are interchanged for the right and left eyes, without changing the association between the image information and the VRAMs for the right and left eyes. The result is the same as that in the prior embodiment. However, in this modification, in particular, the storage destinations of the image information do not need to be interchanged, and only the switching of a bus between the VRAMs and the drivers is necessary, which enables quick processing.

Modification 1 of Orientation Specifying Unit

FIG. 11 is a diagram illustrating a modification of the orientation specifying unit 402 of the three-dimensional image display device. The prior embodiment uses the tilt detection sensor 800 in the orientation detection unit 50, while in this modification, the user is photographed using the image capture unit 20 mounted in the display device 2, image recognition is performed on the face of the photographed user, and the orientation of the device is specified from the orientation of the face obtained as a result of the recognition. The user photographed by the image capture unit 20 located in the upper lateral center of the three-dimensional display 30 is as shown in an image 1101 when the device is in the laterally upright orientation, as shown in an image 1103 when the device is in the laterally inverted orientation, as shown in an image 1104 when the device is in the right-up lengthwise orientation, and as shown in an image 1102 when the device is in the left-up lengthwise orientation.

With a known technique for recognizing a person's face, e.g., by recognizing the eyes and the mouth of a person with a pattern matching method, the eyes can be recognized at positions 1105 and 1106, and the mouth can be recognized at a position 1107. Here, assuming that the centers of gravity of these eyes and mouth are P1, P2, and P0, respectively, a substantially isosceles triangle shown with a broken line is obtained by connecting these three points. The orientation of the face conforms to the position of the mouth, that is, the orientation of the vertex P0 of the isosceles triangle. That is to say, the orientation of the device can be specified as the laterally upright orientation if the vertex P0 is on the lower side of a landscape photographic screen, specified as the laterally inverted orientation if the vertex P0 is on the upper side, specified as the right-up lengthwise orientation if the vertex P0 is on the left side, and specified as the left-up lengthwise orientation if the vertex P0 is on the right side. All the determinations by the orientation specifying unit 402 in step S602, step S604, and step S608 in the prior embodiment conform to the results of the above specifications. With this method, the positional relationship between the user and the screen can be directly detected without making any particular assumption.

Although the specification cannot be performed if the device is horizontal in the prior embodiment, this modification has an advantage in that the specification is substantially possible even when the device is horizontal.

Modification 2 of Orientation Specifying Unit

FIGS. 12A and 12B are diagrams illustrating a modification 2 for specifying the orientation of the device. The prior embodiment uses the tilt detection sensor 800 in the orientation detection unit 50, while in the modification 2, the orientation of the device is specified using an acceleration sensor in the orientation detection unit 50. The acceleration sensor used in the modification 2 can obtain acceleration components in X, Y, and Z directions. The orientation of the device is determined to be any of the laterally upright orientation, the laterally inverted orientation, the right-up lengthwise orientation, and the left-up lengthwise orientation, based on the orientation of the gravity detected by the acceleration sensor.

The gravity direction of the device can be regarded as the orientation of a vector of the sum of the accelerations on an x axis, a y axis, and a z axis, with use of a large amount of the acceleration data regarding these axes that is detected within a predetermined period of time. Accordingly, in FIG. 12A, assuming that the accelerations on the respective axes obtained from the acceleration sensor in step S1201 at a sampling time i are:

x-axis acceleration: $Ax[i]$
y-axis acceleration: $Ay[i]$
z-axis acceleration: $Az[i]$ the sums obtained by adding together N pieces of the acceleration data from sampling times 1 to N in step S1202 are expressed as follows:

$$ASx = \Sigma_{i=1}^{N} Ax[i]$$

$$ASy = \Sigma_{i=1}^{N} Ay[i]$$

$$ASz = \Sigma_{i=1}^{N} Az[i]$$

The gravity vector G is expressed as follows:

$$G = (gx, gy, gz) = (ASx, ASy, ASz)$$

In step S1203, if it is determined that measured values from N times of measurement have been integrated, in step S1204, the components in the respective axes of the gravity vector G are binarized using a predetermined threshold value, and the direction of the device can be determined to be any one of the four directions in accordance with which side of the device the gravity vector G is directed toward. Alternatively, since the directions of the respective axes are fixed with respect to the three-dimensional image display device, assuming that the x and y axes respectively indicate the lengthwise and lateral directions of the screen, and that the z axis indicates the depth direction of the screen, for example, the z component of the acceleration can be disregarded in the determination of the orientation of the screen (in other words, the acceleration sensor may be a two-axis sensor for detecting the two axes other than the z axis). For this reason, the axis of the larger value of ASx and ASy forms a smaller angle with the vertical line. That is to say, it can be determined that the three-dimensional image display device is held with this axis being the lengthwise direction. It is thereby possible to determine whether the three-dimensional image display device is in the laterally upright orientation, the laterally inverted orientation, the right-up lengthwise orientation, or the left-up lengthwise orientation. A table 1210 in FIG. 12B indicates the results of the binarization of the obtained gravity vector and the orientations of the device specified from each result.

As in the prior embodiment, if it is determined that the device is horizontal, the orientation of the device is considered to be the previously obtained orientation or the laterally upright orientation. All the determinations by the orientation specifying unit 402 in step S602, step S604, and step S608 in the prior embodiment conform to the orientation specification results indicated in the table 1210.

The present modification has an advantage in that an inexpensive acceleration sensor can be used, the orientation of the device can be specified with a smaller number of calculation times, and the originally intended usage of the image capture means used in the prior modification is not obstructed.

The above-described embodiment takes, as an example, the display device that displays the right-eye image and the left-eye image in alternating pixel lines. However, even when the right-eye image and the left-eye image are collectively displayed on the right side and the left side respectively as viewed by the user to obtain a so-called stereo image, an omnidirectional stereoscopic view can be realized by replacing the images in accordance with the orientation of the display such that the left and right images are disposed on the left side and the right side respectively of the user.

Second Embodiment

Another Embodiment Using Lenticular Lens Multi-View Display

Although the prior embodiment was described in detail using an example of using the parallax barrier three-dimensional display, the present invention is also applicable in the case of using a lenticular lens multi-view display. First, a lenticular lens multi-view display will be described using FIGS. 13A to 13D. A lenticular lens multi-view display used as a three-dimensional display 30 in FIG. 13A has a liquid crystal display 300 and lenticular lenses 301 that are provided over the entire surface of the liquid crystal display 300. The lenticular lens multi-view display further has a touch panel 40 over the entire surface thereof, and has an image capture device 20 on the screen at the center thereof. Note that if orientation detection is not performed with the image capture unit 20, the image capture unit 20 does not need to be provided.

FIG. 13B shows the lenticular lenses 301 and display pixels whose relative positions are guaranteed for displaying a multi-view three-dimensional image. FIG. 13B is a cross-sectional view taken by laterally cutting the three-dimensional display 30. The three-dimensional display 30 in FIG. 13B enables display of a multi-view three-dimensional image in the case where the user views the three-dimensional display 30 from six viewpoints. That is to say, each lenticular lens covers a set of 7 display pixels from a pixel 302 to a pixel 303 within one pixel line. Note that since the lenticular lenses extend in the lengthwise orientation, assuming that the number of lines is L, the number of pixels covered by one lenticular lens is 7 pixels×L lines. All lines are configured similarly as shown in FIG. 13B. Although the three-dimensional display 30 is realized with a publicly-known technique and is capable of color display, the three-dimensional display 30 performs monochromatic display and is a one-dimensional display for the sake of simplification in the following description.

FIGS. 13C and 13D show the pixels that can be viewed when a person views the pixels from different viewpoints 1 and 4, respectively. That is to say, due to the optical characteristics of the lenticular lenses 301, the right eye of the user at the viewpoint 1 can only view pixels 2, and the left eye of the user at the viewpoint 1 can only view pixels 1. The right eye of the user at the viewpoint 4 can only view pixels 5, and the left eye of the user at the viewpoint 4 can only view pixels 4. Since parallax images corresponding to the respective viewpoints are displayed with a set of seven elements, and one three-dimensional image is displayed using two adjacent pixels, a stereoscopic view from six different viewpoints is possible in the case where a set of seven pixels are covered with a lenticular lens as in this example. The principle of such three-dimensional image display with lenticular lenses is known, and is not described in further detail in the present specification. FIG. 14 shows a relationship between an object and image 1 to image 7 that can be viewed by the left and right eyes of the user from the respective viewpoints.

To obtain a three-dimensional image that is three-dimensionally displayed at each viewpoint, a pair of two-dimensional images corresponding to respective images that are viewed by the left and right eyes of the user are photographed. To three-dimensionally display the same object from viewpoints 1 to 6 in a successive manner, an image N that is viewed by the left eye of the user at a viewpoint N (N is an integer of any of 1 to 6) is the same as an image that is viewed by the right eye of the user from a viewpoint N−1. Note that in the present invention, an entire image displayed by the three-dimensional display, that is, all displayed image objects are collectively referred to as the "object". If two-dimensional image information that indicates these images is divided and displayed with liquid crystal display pixels whose relative positions with respect to the lenticular lens 301 are maintained, the same stereoscopic image as that when the object is viewed from each viewpoint shown in FIG. 14 can be viewed. That is to say, the pixel 1 shown in FIGS. 13C and 13D is a part of the two-dimensional image information that indicates a two-dimensional image (image 1) photographed on the left side of the viewpoint 1, and the pixel 2 is a part of the two-dimensional image information that indicates a two-dimensional image (image 2) photographed on the right side of the viewpoint 1. The pixel 4 is a part of the two-dimensional image information that indicates a two-dimensional image (image 4) photographed on the left side of the viewpoint 4, and the pixel 5 is a part of the two-dimensional image information that indicates a two-dimensional image (image 5) photographed on the right side of the viewpoint 4.

Incidentally, FIGS. 15A and 15B show how an image is viewed in the case where the lenticular lens multi-view images display is turned 180 degrees. As in the prior embodiment, the lenticular lens and the display pixels maintain a fixed optical positional relationship, and accordingly, the left eye at a viewpoint 3 in FIG. 15A can view the image 4, and the right eye at the viewpoint 3 can view the image 5. Compared with the relationship between the viewpoints and the images viewed by the user shown in FIG. 14, the image cannot be viewed as a normal three-dimensional image in FIG. 15A since, although originally the image 3 and the image 4 need to be displayed for the left eye and the right eye respectively at the viewpoint 3 to obtain a normal three-dimensional image, the viewpoints and the left and right images are inverted. That is to say, in order to normally perform multi-view three-dimensional display even when the device is in the laterally inverted orientation, it is necessary to turn the image information 180 degrees and cause a display element that displays the image N when in the laterally upright orientation to display an image (8-N). FIG. 15B similarly shows that the images viewed by the left and right eyes from the viewpoint 6 are images 1 and 2, respectively. As shown in FIG. 13C, the images 1 and 2 are to be images that are viewed by the left eye and the right eye respectively at the viewpoint 1, accordingly the correspondence between the viewpoint and the images is different from its original correspondence, and moreover, the left and the right are opposite, which results in inversion in the depth direction.

Figure 16B:
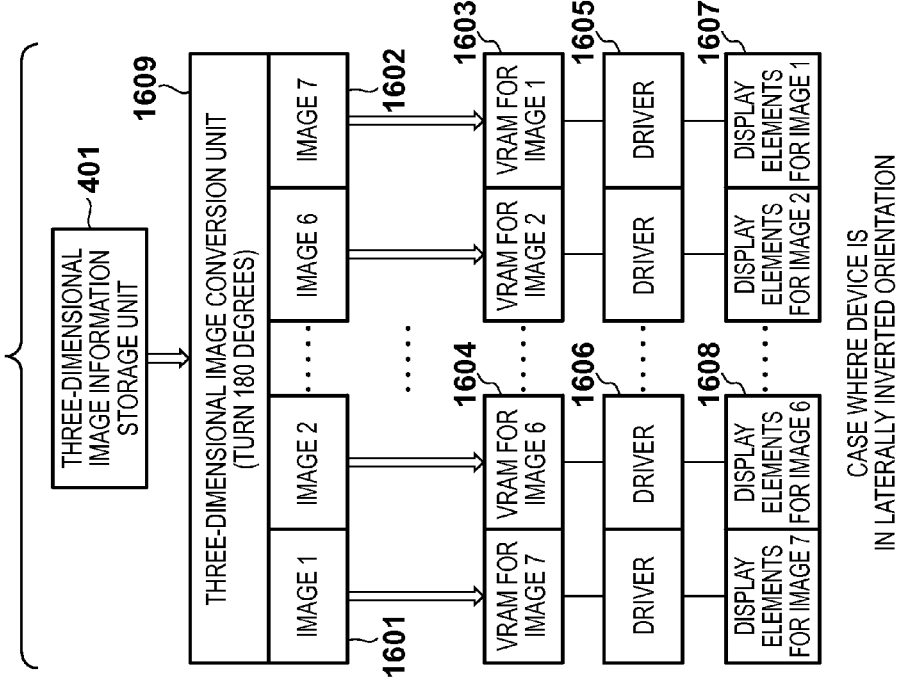
FIGS. 16A and 16B are diagrams illustrating another embodiment of a multi-view three-dimensional image display control unit in accordance with orientations according to an embodiment.
Figure 16A:
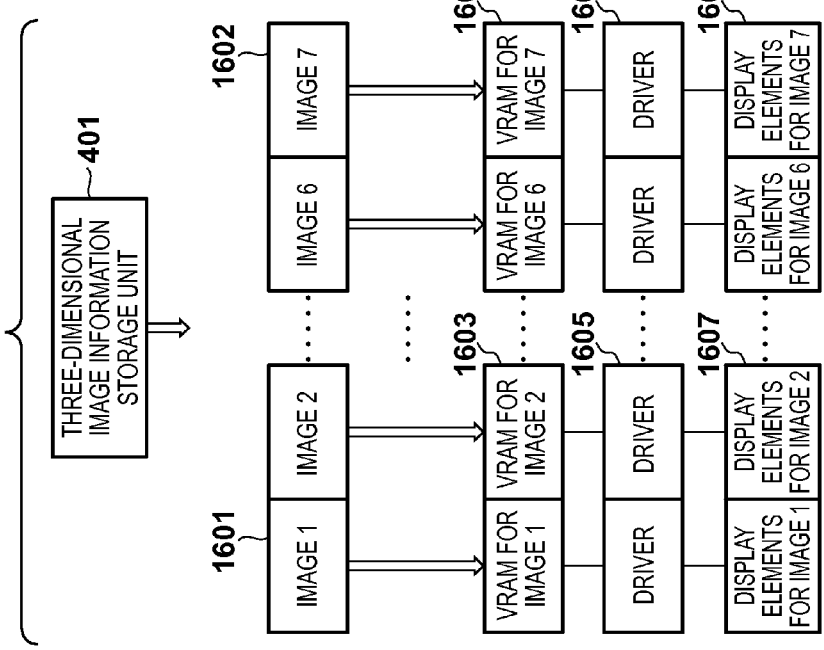
Figure 17:
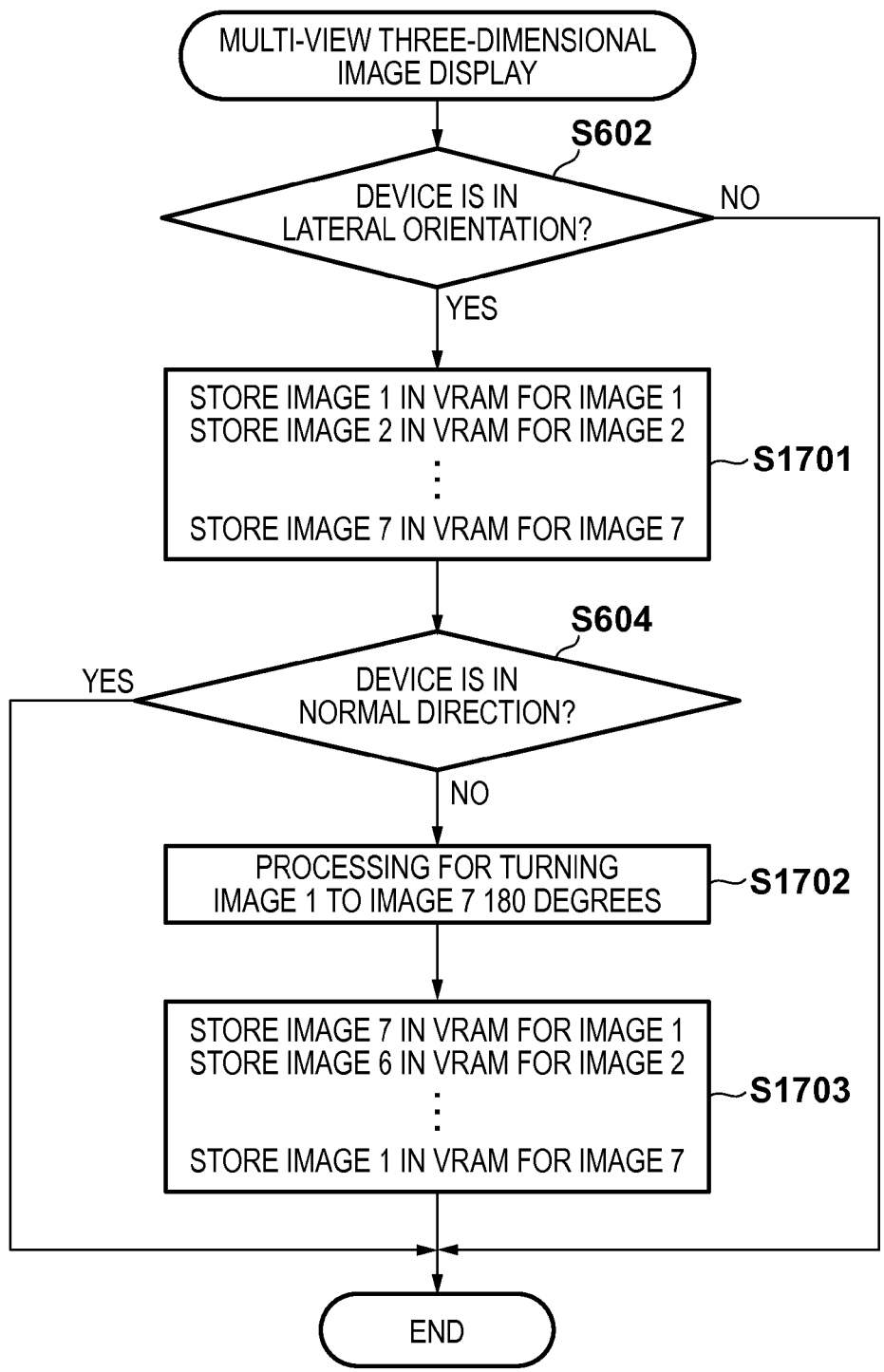
FIG. 17 is a flowchart of multi-view three-dimensional display control in accordance with orientation according to an embodiment.

FIGS. 16A and 16B show examples of multi-view three-dimensional display control in accordance with the orientation of the device in the present embodiment, and FIG. 17 shows a flowchart of the control procedure. In step S602, the orientation specifying unit 402 determines whether the orientation of the device is lengthwise or lateral, and if lateral, the three-dimensional display 30 can perform three-dimensional display with the lenticular lens method, and accordingly the processing branches into step S1701. In step S1701, in order to display a three-dimensional image from six viewpoints to be displayed, the three-dimensional image display control unit 404 reads out seven pieces of image information, namely image information 1601 for the image 1 to image information 1602 for the image 7 from the three-dimensional image information storage unit 401, and writes respective pieces of the read image information in a VRAM 1603 for the image 1 to a VRAM 1604 for the image 7.

In step S604, if the orientation specifying unit 402 further determines that the direction is the laterally upright direction, the processing ends. As shown in FIGS. 16A and 16B, the image information written in the VRAM 1603 for the image 1 to the VRAM 1604 for the image 7 is directly connected to a driver that drives a display element 1607 for the image 1 to a driver 1605 that drives a display element 1608 for the image 7 in one-to-one correspondence. Accordingly, in a state where the device is in the laterally upright orientation, a continuous three-dimensional image can be displayed when the user views the images from the six viewpoints.

Next, a detailed description will be given to the case where the device is in the horizontally inverted orientation. If the orientation specifying unit 402 determines in step S604 that the device is in the laterally inverted orientation, the processing branches to step S1702. To correctly display a multi-view three-dimensional image in a state where the three-dimensional display 30 is inverted, first, in step S1702, the three-dimensional image information conversion unit 403 turns the image information 1601 for the image 1 to the image information 1602 for the image 7 180 degrees.

Note that when the device is used in the laterally inverted orientation, as described above, three-dimensional display cannot be correctly performed only by turning the image information 180 degrees in the three-dimensional image information conversion unit 403 in step 1702. Therefore, the three-dimensional image display control unit 404 reads out the image information 1601 for the image 1 to the image information 1602 for the image 7 that has been turned 180 degrees in the three-dimensional image conversion unit 403 in step 1703, and, conversely to the case of the laterally upright orientation, writes the image information 1601 for the image 1 in the VRAM 1604 for displaying the image 7, writes the image information for the image 2 in the VRAM for displaying the image 6, writes the image information for the image 3 in the VRAM for displaying the image 5, writes the image information for the image 4 in the VRAM for displaying the image 4, writes the image information for the image 5 in the VRAM for displaying the image 3, writes the image information for the image 6 in the VRAM for displaying the image 2, and writes the image information 1602 for the image 7 in the VRAM 1603 for displaying the image 1. That is to say, the images are turned 180 degrees, and additionally, the order of the images for the respective viewpoints is also reversed. Note that this also applies to the first embodiment, and if a focus is placed only on the relationship between the orientation of the three-dimensional image display device and processing of the image information, the processing that is the same as in the present embodiment in the case where the number of viewpoints is 1 is performed in the first embodiment.

Note that the three-dimensional display in the present embodiment cannot perform three-dimensional display when in the lengthwise direction, and it is also difficult to perform two-dimensional display due to the lenticular lenses. For this reason, it is detected whether the device is in the laterally upright orientation or the laterally inverted orientation, and only the switching of the above-described three-dimensional display control is performed.

Other Embodiments

The present embodiment discloses an example in which three-dimensional display cannot be performed when the device is in the lengthwise orientation. However, in the case of a three-dimensional image display with which the direction of the parallax barrier can be electrically changed to the orthogonal direction when the device is in the lengthwise orientation, for example, the device used in the right-up lengthwise orientation and the device used in the left-up lengthwise orientation are in completely the same 180-degree relationship as the relationship between the laterally upright orientation and the laterally inverted orientation that are described above according to the optical characteristics of this three-dimensional image display, and therefore, normal three-dimensional display can be performed by carrying out the present invention similarly as described above.

Although the present embodiment discloses a technique for performing three-dimensional display control in unit of paired parallax images for the respective viewpoints, in the case where a pair of parallax images is handled as a whole as a single piece of image information to perform display in the laterally inverted orientation, for example, three-dimensional display can be normally performed as in the present embodiments of the present invention if the display positions can be adjusted by turning these whole images 180 degrees such that the respective display pixels for the left-eye and right-eye images display the opposite images.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-048490, filed Mar. 11, 2013 which is hereby incorporated by reference herein in its entirety.

What is claimed is:

1. An image display device comprising:
    a stereoscopic screen which displays a left-eye image and an right-eye image that reflect a parallax between left and right eyes of a user;
    a detection unit which detects an orientation of the stereoscopic screen; and
    a display control unit which displays, on the stereoscopic screen, the left-eye image and the right-eye image in a predetermined direction and in a predetermined arrangement for the left eye and the right eye, respectively, based on the orientation detected by the detection unit,
    wherein if the orientation detected by the detection unit is an upright direction, the display control unit causes the left-eye image and the right-eye image to be displayed in the upright direction in a predetermined arrangement in which the left-eye image and the right-eye image can be viewed by the left and right eyes respectively of the user, and if the detected orientation is a direction opposite to the upright direction, the display control unit turns the left-eye image and the right-eye image 180 degrees from the upright direction, and causes the left-eye image and the right-eye image to be displayed in an arrangement that is the inverse of the predetermined arrangement.

2. The image display device according to claim 1, wherein the stereoscopic screen displays the left-eye image and the right-eye image with a parallax barrier method, and
    wherein if the detected orientation is a direction perpendicular to the upright direction, the display control unit turns one of the left-eye image and the right-eye image in the detected direction, and causes the turned image to be displayed as the left-eye image and the right-eye image.

3. The image display device according to claim 2, further comprising:
    a storage unit for each of the left-eye image and the right-eye image,
    wherein the stereoscopic screen displays an image stored in the storage unit for the left-eye image as the left-eye image, and displays an image stored in the storage unit for the right-eye image as the right-eye image,
    wherein if the orientation detected by the detection unit is the upright direction, the display control unit causes the left-eye image and the right-eye image to be displayed in the upright direction in the predetermined arrangement by storing the left-eye image and the right-eye image in the storage unit for the left-eye image and the storage unit for the right-eye image, respectively, and
    wherein if the detected orientation is the direction opposite to the upright direction, the display control unit causes the right-eye image and the left-eye image to be displayed in an arrangement that is the inverse of the predetermined arrangement by turning the left-eye image and the right-eye image 180 degrees from the upright direction, storing the right-eye image in the storage unit for the left-eye image, and storing the left-eye image in the storage unit for the right-eye image.

4. The image display device according to claim 2, further comprising:
    a storage unit having a storage unit for each of the left-eye image and the right-eye image,
    wherein the stereoscopic screen displays an image stored in a selected storage unit as the left-eye image, and displays an image stored in the other storage unit as the right-eye image,
    wherein if the orientation detected by the detection unit is the upright direction, the display control unit causes the left-eye image and the right-eye image to be displayed in the upright direction in the predetermined arrangement by storing the left-eye image and the right-eye image in the storage unit for the left-eye image and the storage unit for the right-eye image, respectively, and setting the storage unit for storing the right-eye image as the selected storage unit, and
    wherein if the detected orientation is the direction opposite to the upright direction, the display control unit causes the left-eye image and the right-eye image to be displayed in an arrangement that is the inverse of the predetermined arrangement by turning the left-eye image and the right-eye image 180 degrees from the upright direction, storing the turned left-eye image and the turned right-eye image in the storage unit for the left-eye image and the storage unit for the right-eye image, respectively, and setting the storage unit for storing the left-eye image as the selected storage unit.

5. The image display device according to claim 1, wherein the stereoscopic screen displays images corresponding to a plurality of viewpoints as the left-eye image and the right-eye image in an arrangement corresponding to directions of the respective viewpoints, with a lenticular lens method,
    wherein if the orientation detected by the detection unit is the upright direction, the display control unit causes the images corresponding to the respective viewpoints to be displayed in the upright direction in a predetermined arrangement in which the left-eye image and the right-eye image at each of the viewpoints can be viewed by the left and right eyes respectively of the user, and
    wherein if the detected orientation is the direction opposite to the upright direction, the display control unit turns the images corresponding to the respective viewpoints 180 degrees from the upright direction and displays the images in an arrangement that is the inverse of the predetermined arrangement.

6. The image display device according to claim 1, wherein the detection unit has a sensor for detecting a vertical direction, and detects that the device is in the upright direction if a predetermined side of the stereoscopic screen is aligned with the vertical direction.

7. The image display device according to claim 1, wherein the detection unit has a sensor for detecting a direction in which the user is present.

8. An image display method for displaying a left-eye image and a right-eye image that reflect a parallax between left and right eyes of a user on a stereoscopic screen, comprising:

detecting an orientation of the stereoscopic screen; and displaying the left-eye image and the right-eye image on the stereoscopic screen in a predetermined direction and in a predetermined arrangement for the left eye and the right eye, respectively, based on the detected orientation, wherein the displaying includes performing, if the orientation detected by the detection is an upright direction, a first process of displaying the left-eye image and the right-eye image in the upright direction in a predetermined arrangement in which the left-eye image and the right-eye image can be viewed by the left and right eyes respectively of the user, and performing, if the detected orientation is a direction opposite to the upright direction, a second process of turning the left-eye image and the right-eye image 180 degrees from the upright direction and displaying the left-eye image and the right-eye image in an arrangement that is the inverse of the predetermined arrangement.

9. An image display device for displaying an image for a left eye of a user and an image for a right eye of the user, the images for the left eye and the right eye reflecting a parallax between the left and right eyes of the user, comprising:

a stereo display;

a detection unit which detects an orientation of the image display device; and a display control unit which displays the image for the left eye and the image for the right eye on the stereo display in a first arrangement according to the detected orientation being a first direction, wherein, in the first arrangement, the image for the left eye is displayed on first locations of the stereo display and the image for the right eye is displayed on second locations of the stereo display, wherein the display control unit displays the image for the left eye and the image for the right eye on the stereo display in a second arrangement according to the detected orientation being a second direction opposite to the first direction, wherein, in the second arrangement, the image for the left eye is displayed on the second locations of the stereo display and the image for the right eye is displayed on the first locations of the stereo display.

10. The image display device according to claim 9, wherein the display control unit rotates the images for the left and right eyes 180 degrees and displays the rotated images for the left and right eyes on the stereo display according to the detected orientation being the second direction.

11. An image display device for displaying an image including a first image part for a left eye of a user and a second image part for a right eye of the user, the first and second image parts reflecting a parallax between the left and right eyes of the user, comprising:

a stereo display;

a display control unit which displays the image on the stereo display in a first arrangement, wherein, in the first arrangement, the first image part is displayed on a first locations of the stereo display and the second image part is displayed on a second locations of the stereo display; and a detection unit which detects an orientation of the image display device, wherein the display control unit displays the image on the stereo display in a second arrangement according to the detection of the orientation of the image display device having been rotated 180 degrees, wherein, in the second arrangement, the first image part is displayed on the second locations of the stereo display and the second image part is displayed on the first locations of the stereo display.

12. The image display device according to claim 11, wherein the display control unit displays a version of the image that has been rotated 180 degrees on the stereo display in the second arrangement according to the detection of the orientation of the image display device having been rotated 180 degrees, wherein, in the second arrangement, the first image part is displayed on the second locations of the stereo display and the second image part is displayed on the first locations of the stereo display.

13. The image display device according to claim 12, wherein the display control unit obtains the version of the image having been rotated 180 degrees by rotating the first and second image parts 180 degrees according to the detection of the orientation of the image display device having been rotated 180 degrees.

14. A handheld device comprising:

a stereoscopic screen which displays a first image and a second image that reflect a parallax between left and right eyes of a user;

a detector for detecting an orientation of the handheld device; and a display controller for displaying on the stereoscopic screen, in an arrangement based on the detected orientation, the first image and the second image, which have been rotated based on the detected orientation, for the left eye and the right eye, respectively.

15. The handheld device according to claim 14, wherein (a) if the detected orientation is a first direction, the display controller displays the first image and the second image on the stereoscopic screen in a predetermined arrangement in which the first image and the second image can be viewed by the left and right eyes respectively of the user, and (b) if the detected orientation is in a second direction opposite to the first direction, the display controller rotates the first image and the second image by 180 degrees, and displays the first image and the second image rotated by 180 degrees on the stereoscopic screen in an arrangement that is the inverse of the predetermined arrangement.

16. The handheld device according to claim 15, wherein, if the detected orientation is a direction perpendicular to the first direction, the display controller rotates one of the first image and the second image by 90 degrees, and displays the image rotated by 90 degrees on the stereoscopic screen as both the left-eye image and the right-eye image.

17. The handheld device according to claim 14, wherein the detector comprises a sensor for detecting a vertical direction, and detects that the orientation of the handheld device is the first direction if a particular side of the handheld device is determined, by means of the sensor, to be aligned with the vertical direction.

* * * * *